United States Patent
Kenney et al.

(10) Patent No.: US 11,080,055 B2
(45) Date of Patent: Aug. 3, 2021

(54) REGISTER FILE ARBITRATION

(71) Applicant: Apple Inc., Cupertino, CA (US)

(72) Inventors: Robert D. Kenney, Austin, TX (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/548,797

(22) Filed: Aug. 22, 2019

(65) Prior Publication Data

US 2021/0055929 A1 Feb. 25, 2021

(51) Int. Cl.
*G06F 9/30* (2018.01)

(52) U.S. Cl.
CPC ........ *G06F 9/3012* (2013.01); *G06F 2213/36* (2013.01)

(58) Field of Classification Search
None
See application file for complete search history.

(56) References Cited

U.S. PATENT DOCUMENTS

| | | | |
|---|---|---|---|
| 7,315,935 B1* | 1/2008 | Alsup | G06F 9/30141 712/214 |
| 7,522,170 B2 | 4/2009 | Parikh et al. | |
| 8,380,884 B2 | 2/2013 | Ramchandran | |
| 9,330,432 B2* | 5/2016 | Havlir | G06T 1/20 |
| 9,575,665 B2 | 2/2017 | MacInnis et al. | |
| 10,180,856 B2* | 1/2019 | Chan | G06F 9/3836 |
| 2014/0132611 A1* | 5/2014 | Chen | G06F 13/1663 345/502 |
| 2014/0223101 A1* | 8/2014 | Jackson | G06F 12/0875 711/125 |

* cited by examiner

*Primary Examiner* — Corey S Faherty
(74) *Attorney, Agent, or Firm* — Kowert, Hood, Munyon, Rankin & Goetzel, P.C.

(57) ABSTRACT

Techniques are disclosed relating to arbitration among register file accesses. In some embodiments, an apparatus includes a register file configured to store operands for multiple client circuits and arbitration circuitry configured to select from among multiple received requests to access the register file. In some embodiments, the apparatus includes first interface circuitry configured to provide access requests from a first client circuit to the arbitration circuitry and supplemental interface circuitry configured to receive unsuccessful requests from the first client circuit and provide the received unsuccessful requests to the arbitration circuitry. The supplemental interface circuitry may provide additional catch-up bandwidth to clients that lose arbitration, which may result in fairness during bandwidth shortages.

20 Claims, 6 Drawing Sheets

REGISTER FILE ARBITRATION

TECHNICAL FIELD

This disclosure relates generally to register files and more particularly to arbitration among multiple register file client circuits.

DESCRIPTION OF THE RELATED ART

Register files are used in various types of processors to store operand data, e.g., input operands for execution units and output operands generated based on specified operations. In certain applications such as graphics processors, register files may be shared among multiple client circuits. For example, a register file may be shared by one or more datapaths and other units such as sampling circuitry, load/store circuitry, interpolation circuitry, fragment feedback, pixel back-end circuitry, etc.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "register file configured to store operands" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

In various applications such as graphics processors, multiple client circuits may access the same register file, while the register file may include multiple separately-accessible banks. In some embodiments, disclosed arbitration and interface circuitry encapsulates the register file, providing a simple interface for each client (e.g., a valid/ready interface), supporting clients with different access characteristics (e.g., clients that access different numbers of bytes per clock), reflecting bandwidth shortages evenly among clients, providing recovery bandwidth for clients that lose arbitration, providing global arbitration, providing batched transactions, or operating according to an expected latency.

Figure 1:
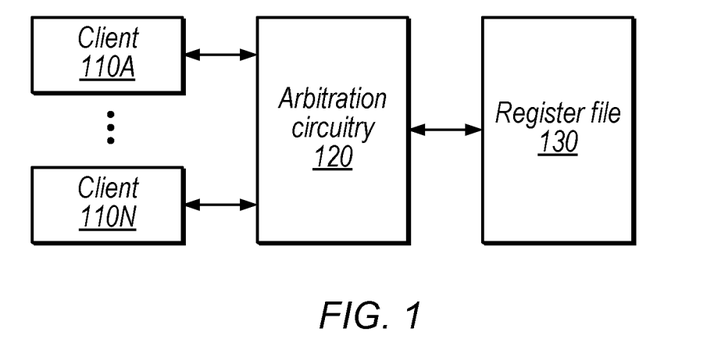
FIG. 1 is a block diagram illustrating example arbitration circuitry for a register file, according to some embodiments.

FIG. 1 is a block diagram illustrating example arbitration circuitry, according to some embodiments. In the illustrated embodiment, client circuits 110A-110N request to access register file 130 and arbitration circuitry 120 is configured to select from among the requests. For example, arbitration circuitry 120 may grant at most one request to each bank of register file 130 each clock cycle. Examples of different client circuits include, without limitation: datapath circuitry, interpolate circuitry, sampling circuitry, load/store circuitry, etc.

Different clients may request to access different numbers of bytes per clock. In the graphics context, for example, register file entries may be used to store operands for different threads of a single-instruction multiple-data (SIMD) group, and accesses to the register file may access multiple copies of the same register (e.g., for private registers of the different SIMD groups). In some embodiments, register file entries may be configured to store high or low portions of operands and certain access requests may access all of an operand, only the low bits of an operand, only the high bits of an operand, etc. A sample unit may provide coordinates for a number of quads per clock cycle while an interpolation unit may provide a number of varyings per clock cycle.

In some embodiments, the system is configured to provide read data in the order it was requested by a given client. This, combined with dedicated interface circuitry for each client, may allow global arbitration among a set of clients. Each client interface may have a minimum access latency and an expected access latency. The expected access latency may rarely be violated, which may allow clients to implement latency hiding (e.g., using pipelining) to address the expected latency of their respective interfaces. In some embodiments, the system is configured to translate access requests to bank requests that are then arbitrated by arbitration circuitry 120. In some embodiments, requests are queued physically closer to the register file than to the requesting clients, e.g., as discussed below with reference to FIG. 3, which may allow for smaller queues.

Figure 2:
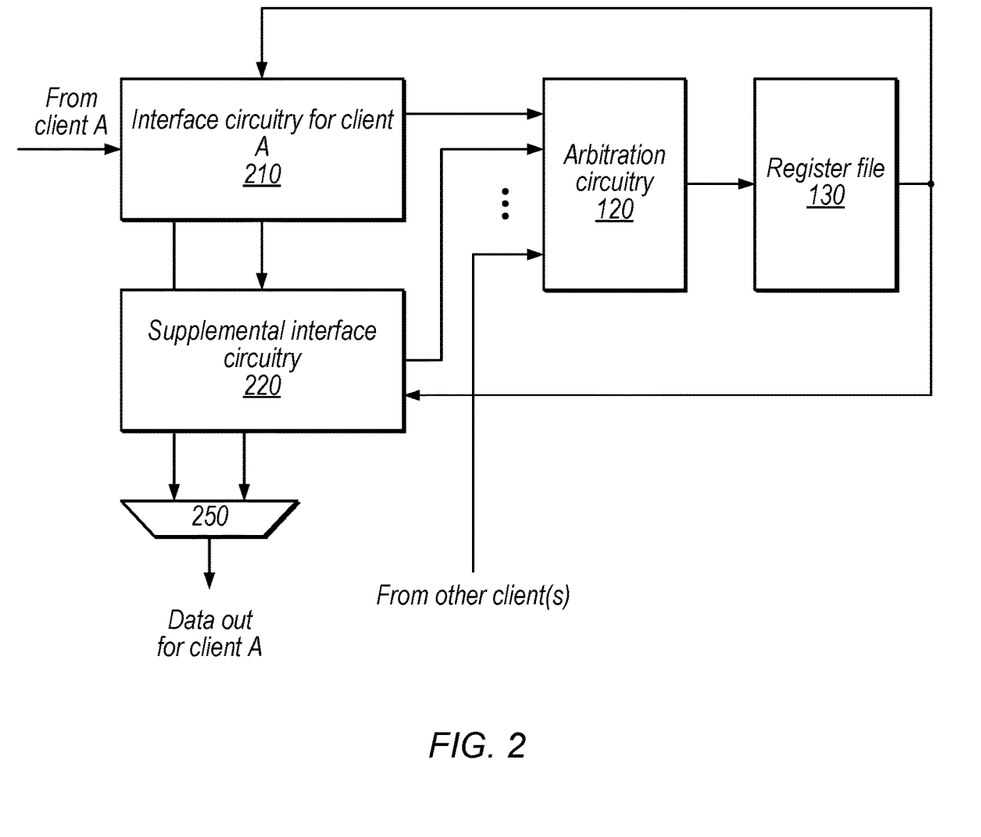
FIG. 2 is a block diagram illustrating example interface circuitry that includes supplemental interface circuitry, according to some embodiments.
Figure 3:
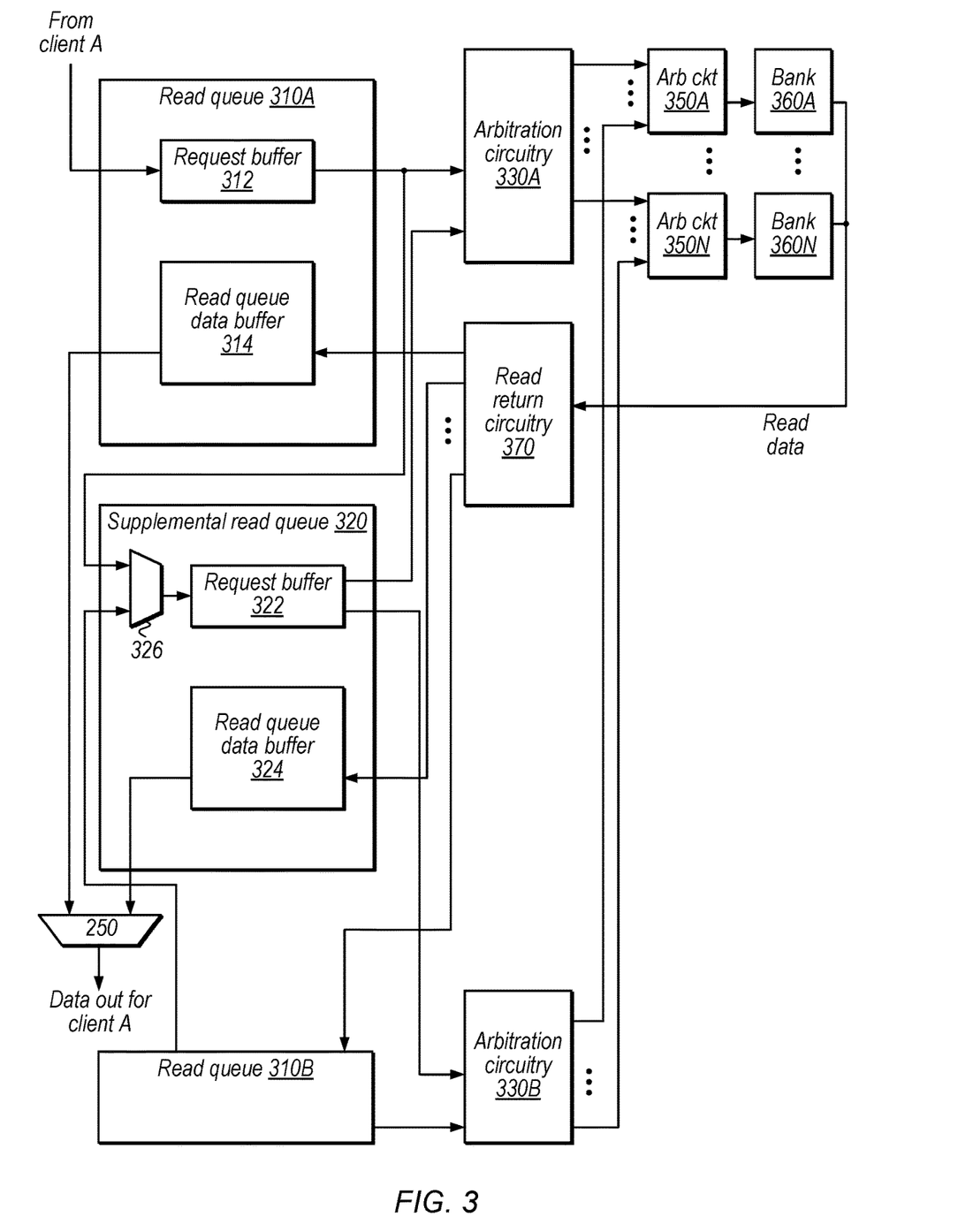
FIG. 3 is a flow diagram illustrating a detailed example of read queue interface circuitry and shared supplemental interface circuitry, according to some embodiments.

In some embodiments, arbitration circuitry is configured to allocate additional catch-up bandwidth to rejected clients, which may facilitate meeting expected latency targets and fairness goals. These supplemental bandwidth techniques may be performed alone or in combination with priority modification associated with rejected clients or requests. FIGS. 2-3, discussed in detail below, show examples of circuitry configured to allow catch-up bandwidth.

Example Interface Circuitry Configured to Grant Additional Bandwidth to Rejected Clients FIG. 2 is a block diagram illustrating interface circuitry that includes supplemental circuitry for rejected requests from a client, according to some embodiments. In the illustrated embodiment, a device includes interface circuitry for client A 210, supplemental interface circuitry 220, arbitration circuitry 120, register file 130, and multiplexer 250. As shown, requests from client A are presented to arbitration circuitry 120 by interface circuitry 210 and supplemental interface circuitry 220, along with requests from one or more other clients. Arbitration circuitry 120 then selects from among the requests to access the register file 130. Note that arbitration circuitry 120 may implement separate arbitration for each bank of a multi-bank register file, as discussed in detail below with reference to FIG. 3.

Interface circuitry 210, in some embodiments, is configured to communicate with arbitration circuitry 120 using a valid ready interface where the data source asserts a valid signal when data is ready and the destination generates a ready signal to indicate it can accept the data. In some embodiments, interface circuitry 210 is configured to provide a request at a first priority initially and then re-provide the request in a subsequent cycle with a higher priority if the request is rejected initially. In other embodiments, arbitration circuitry 120 may maintain priority information for each client and may adjust the priority information based on rejecting or accepting client requests.

When a request is rejected, in some embodiments, interface circuitry 210 is configured to send the request to supplemental interface circuitry 220. Note that the supplemental interface circuitry may not accept the request, e.g., if it is shared with other interface circuits also attempting to send requests. In some embodiments, supplemental interface circuitry 220 is configured to initially submit requests at a first priority (e.g., the same priority initially used to interface circuitry 210) and raise the requests to a higher priority if they are rejected by arbitration circuitry. In other embodiments, supplemental interface circuitry 220 always submits requests with an elevated priority level, relative to an initial priority used by interface circuitry 210.

Supplemental interface circuitry 220, in the illustrated embodiment, is configured to re-provide unsuccessful requests to the arbitration circuitry 120 in parallel with primary interface circuitry from various client circuits. In some embodiments, this may provide catch-up bandwidth to clients (e.g., to client A which can submit two requests to different banks in parallel in a given cycle via interface circuitry 210 and 220). In various embodiments, this may provide fairness among clients when there are bank conflicts or bandwidth shortages to the register file. The disclosed techniques may also facilitate determining minimum and expected latency for requests via a given interface, which may be used by clients to determine the amount of latency hiding needed.

Register file 130, in the illustrated embodiment, is configured to provide requested register data to the requesting interface circuitry.

Multiplexer 250, in the illustrated embodiment, is configured to select from read data from interface circuitry 210 and 220 to provide read data output for client A. Note that, in other embodiments, read data from these interface circuits may be provided in parallel rather than being multiplexed.

Arbitration circuitry 120 may use various arbitration techniques for selecting requests. As one example, arbitration circuitry 120 may select the highest-priority request if there is only one such request or use round-robin or age-based techniques to select from multiple requests that all have the current highest priority.

FIG. 3 is a block diagram illustrating example read queue interface circuitry and supplemental circuitry, according to some embodiments. Note that read queues 310 and 320 are specific non-limiting examples of the interface circuitry 210 and 220 of FIG. 2. In the illustrated embodiment, the system includes two client read queues 310A and 310 B, supplemental read queue 320, arbitration circuitry 330A and 330B, arbitration circuitry 350A-350N, register file banks 360A-360N, and read return circuitry 370.

Read queue 310A, in the illustrated embodiment, includes a request buffer 312 dedicated to register file read requests from client A. In some embodiments, when the request buffer 312 is full, client A will no longer send requests until a request from the buffer is accepted and a buffer entry is freed. Note that the request buffer 312 may be located physically closer to the arbitration circuitry than to the requesting client, which may allow for a reduced number of entries, in some embodiments. Read queue 310A also includes a read queue data buffer 314 configured to buffer read data from the register file until it is delivered to client A. While not shown, read queue 310B may include a similar request buffer and read queue data buffer for read requests by client B.

In the illustrated embodiment, clients A and B share supplemental read queue 320. In other embodiments, any of various numbers of clients may share a read queue. Note that the clients sharing a supplemental read queue may be a subset of the clients that send requests to arbitration circuits 350. The amount of catch-up bandwidth available to a given client may depend on the number of clients sharing supplemental interface circuitry and those clients' workload. For example, if supplemental interface circuitry is assigned to a single client, that client's total bandwidth (base bandwidth plus catch-up bandwidth) may be twice the normal bandwidth due to being able to provide two requests in subsequent cycles. When sharing supplemental interface circuitry between two clients, however, the average bandwidth in catch-up scenarios may be one and a half times the normal bandwidth when the other client is also receiving rejections (but still up to twice the normal bandwidth if the other client is not busy). In various embodiments, the number of client circuits assigned to a supplemental read queue may be used to determine expected latency for each client interface, which may be advertised on the interface and may allow clients to perform latency hiding based on the expected latency.

In some embodiments, similar clients are assigned to share supplemental interface circuitry. In some embodiments, clients that typically initiate substantial register file activity at different times may be assigned to share supplemental interface circuitry, e.g., because such clients may have reduced scenarios where both are rejected at the same time. In various embodiments, the supplemental read queue 320 may avoid bubble cycles on data out for busy clients.

Request buffer 312 may provide its oldest request to arbitration circuitry 330A each cycle, assuming a valid request is present. Arbitration circuitry 330A, in the illustrated embodiment, may be included in per-client interface circuitry and is configured to arbitrate among requests to the same bank. For example, if supplemental read queue 320 and read queue 310A both send a request to the same bank for client A, arbitration circuitry 330A will select one of the requests and forward it to the appropriate per-bank arbitration circuit 350. This may ensure that a given arbitration circuit 350 receives at most one request per client each cycle.

Per-bank arbitration circuits 350, in the illustrated embodiment, are configured to select from requests from multiple clients, which may originate from their dedicated interface circuitry or shared interface circuitry. In some embodiments, arbitration circuits 350 are configured to accept one request per bank each cycle and indicate rejection of unselected requests to the appropriate interface circuitry. Arbitration circuitry 350N sends the selected request to the appropriate bank 360 and the accessed banks 360 send their read data to read return circuitry 370. Read return circuitry 370 may include multiplexer or crossbar circuitry, for example, configured to route data from the requested bank to the requesting interface. In some embodiments, register file accesses may take at least three cycles, e.g., for arbitration, memory access, and read return. In these embodiments, the read queue data buffers may be three entries deep, for example.

Note that a given read queue may map to a subset of banks of the register file. In these embodiments, a given client may have dedicated read queues or supplemental read queues corresponding to different subsets of banks.

In some embodiments, when arbitration circuitry rejects a request, read queue 310A is configured to send the request to supplemental read queue 320 via multiplexer 326. If read queue 310B is also sending a request in the same cycle, multiplexer 326 may select from among the requests to provide to request buffer 322 (and rejected requests may remain at their appropriate read queue). In some embodiments, supplemental read queue 320 is configured to arbitrate among clients sharing the supplemental interface fairly, e.g., by accepting a request from the read queue that has the smallest number of entries already reserved in read queue data buffer 324 and using round-robin to select winners when the same number of buffer entries are reserved.

Request buffer 322 and read queue data buffer 324 may operate similarly to elements 312 and 314 and may provide supplemental bandwidth for rejected requests. If a request is blocked by multiplexer 326 at supplemental read queue 320, read queue 310A may raise the priority of the request and re-submit it in a subsequent cycle. In some embodiments, read queue data buffer 324 is implemented as a linked list and each read queue requester includes in-order FIFO circuitry configured to store read pointers into the data buffer 324. Data buffer 324 may include multiple read ports in these embodiments, dedicated to different requesters. This may allowed each client to pop from the read queue data buffer 324 even when other clients are stalled.

Multiplexer 250, in the illustrated embodiment, is configured to provide register read data for client A. In some embodiments, additional control circuitry (not explicitly shown) is configured to control multiplexer 250 to read data from read queue 310A and supplemental read queue 320 in the proper order (e.g., in the order in which data was requested).

In some embodiments, read queue 310A may avoid sending requests to supplemental interface circuitry when the read queue data buffer is full, e.g., to avoid filling the supplemental circuitry with data when the client is not popping data from the queue, which might interfere with other clients sharing the supplemental interface circuitry.

While FIG. 3 focuses on processing read requests, similar techniques may be used for write requests. In some embodiments, instead of using supplemental write queues, each client has a dedicated write queue that is able to send multiple requests per clock cycle. For example, in embodiments in which each write queue includes two read ports, clients may submit two requests for arbitration per clock cycle. When requests are rejected, they may stay in place in the client's queue and the write circuitry may increase the priority of rejected requests. Thus, in some scenarios, the same write queue may have multiple write requests win arbitration in a given cycle, providing the corresponding client with catch-up write bandwidth to the register file.

Example Method

Figure 4:
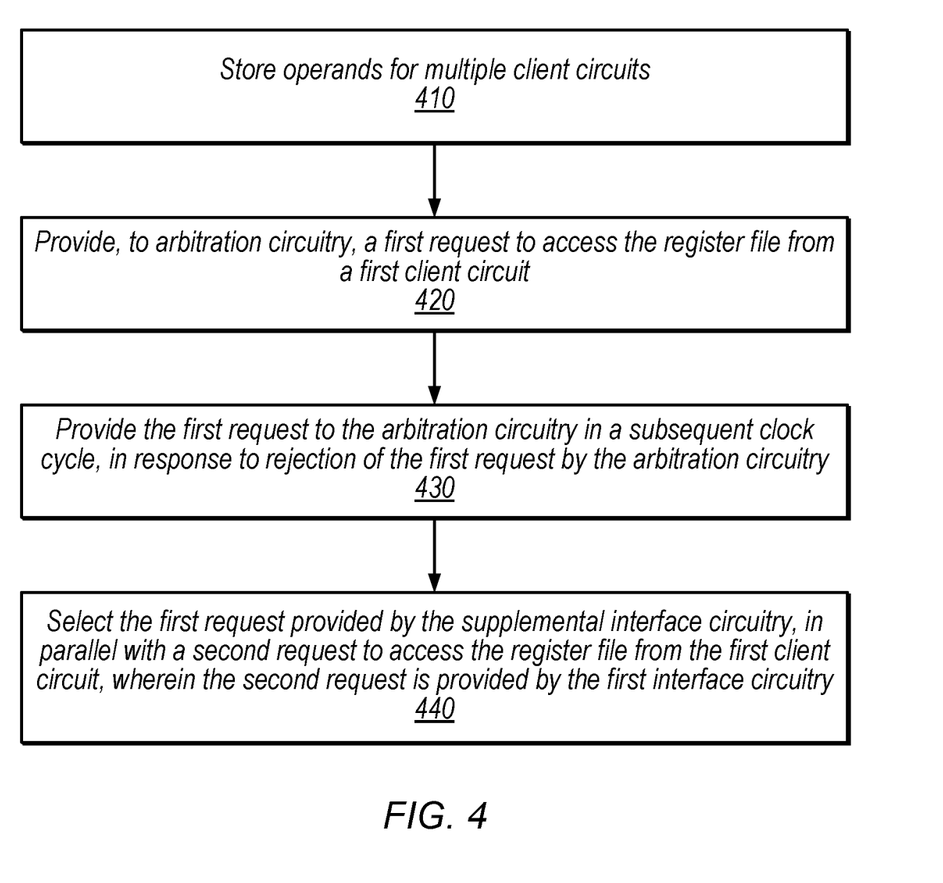
FIG. 4 is a flow diagram illustrating example techniques for processing requests to access a register file, according to some embodiments.

FIG. 4 is a flow diagram illustrating an example method for processing requests to access a register file, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a register file stores operands for multiple client circuits. For example, in the graphics context, the register file may store data for datapath units, sampling circuitry, load/store circuitry, interpolation circuitry, fragment feedback, pixel back-end circuitry, etc. The different client circuits may be configured to request accesses with different numbers of bytes of register file data per clock cycle. These requests may use a valid/ready interface. Interface circuitry may convert requests to per-bank access requests, which may be arbitrated.

At 420, in the illustrated embodiment, first interface circuitry provides, to arbitration circuitry, a first request to access the register file from a first client circuit. For example, read queue 310A may send a request from client A via request buffer 312 to arbitration circuitry 350.

At 430, in the illustrated embodiment, supplemental interface circuitry provides the first request to the arbitration circuitry in a subsequent clock cycle, in response to rejection of the first request by the arbitration circuitry. For example, arbitration circuitry 330 or 350 may reject a request from read queue 310A, which may then present the request to supplemental read queue 320. Note that, if the supplemental read queue 320 also rejects the request, read queue 310A may re-submit the request to the arbitration circuitry with a higher priority.

At 440, in the illustrated embodiment, arbitration circuitry selects the first request provided by the supplemental interface circuitry, in parallel with a second request to access the register file from the first client circuit, wherein the second request is provided by the first interface circuitry. For example, read queue 310A may send a request to access bank 360A in the same cycle in which supplemental read queue 320 sends a request to access bank 360N, and arbitration circuitry 350 may accept both requests. This situation may provide catch-up bandwidth based on the initial rejection.

In some embodiments, the supplemental interface circuitry is configured to receive unsuccessful requests from multiple client circuits, buffer received unsuccessful requests (e.g., using request buffer 322), and provide the buffered unsuccessful requests to the arbitration circuitry. In some embodiments, the supplemental interface circuitry is configured to select between rejected requests from multiple client circuits in a cycle based on amounts of data buffer space reserved for respective ones of the multiple client circuits. In some embodiments, the supplemental interface circuitry includes a data buffer configured to store accessed register file data and the data buffer includes multiple ports that are dedicated to respective different client circuits that share the supplemental interface circuitry.

In various embodiments, the disclosed techniques may advantageously provide simple client interfaces (e.g., valid/ready) to disparate client circuits, allow client circuits to operate based on expected latencies, provide fairness among client circuits, provide in-order data return, provide bank-collision tolerance, reduce data queuing, allow global arbitration, reduce overall power consumption in accessing a register file, or improve overall performance of register file accesses.

Example Device

Figure 5:
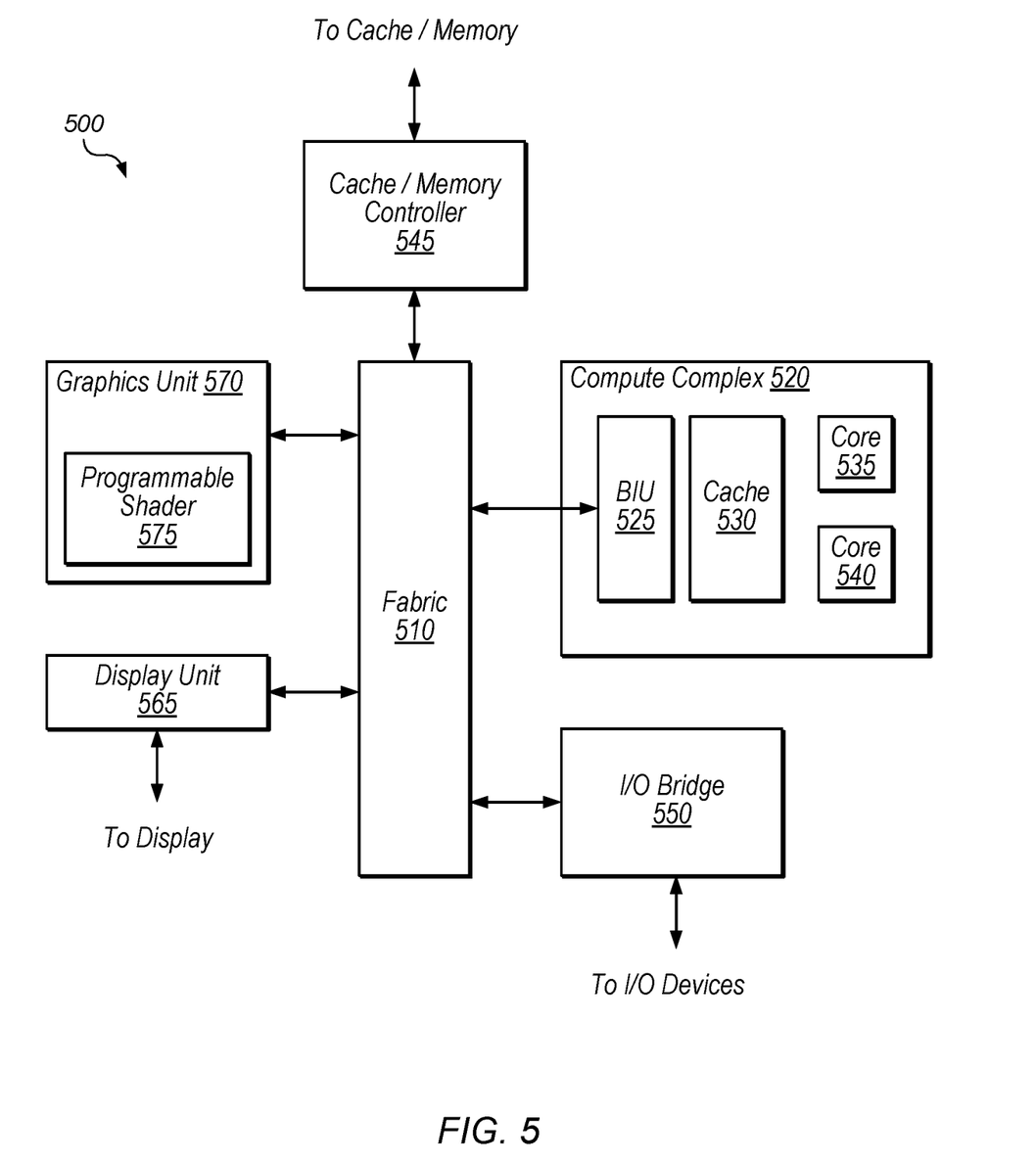
FIG. 5 is a block diagram illustrating an example computing device that may include one or more shared register files, according to some embodiments.

Referring now to FIG. 5, a block diagram illustrating an example embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520 input/output (I/O) bridge 550, cache/memory controller 545, graphics unit 570, and display unit 565. In some embodiments, device 500 may include other components (not shown) in addition to and/or in place of the illustrated components, such as video processor encoders and decoders, image processing or recognition elements, computer vision elements, etc.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of processors, processor cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 570 may be described as "coupled to" a memory through fabric 510 and cache/memory controller 545. In contrast, in the illustrated embodiment of FIG. 5, graphics unit 570 is "directly coupled" to fabric 510 because there are no intervening elements.

Graphics unit 570 may include one or more processors and/or one or more graphics processing units (GPU's). Graphics unit 570 may receive graphics-oriented instructions, such as OPENGL®, Metal, or DIRECT3D® instructions, for example. Graphics unit 570 may execute specialized GPU instructions or perform other operations based on the received graphics-oriented instructions. Graphics unit 570 may generally be configured to process large blocks of data in parallel and may build images in a frame buffer for output to a display. Graphics unit 570 may include transform, lighting, triangle, and/or rendering engines in one or more graphics processing pipelines. Graphics unit 570 may output pixel information for display images. Programmable shader 575, in various embodiments, may include highly parallel execution cores configured to execute graphics programs, which may include pixel tasks, vertex tasks, and compute tasks (which may or may not be graphics-related).

In some embodiments, the interface and arbitration circuitry is included in programmable shader 575. In other embodiments, the disclosed techniques may be utilized for various register files, e.g., in one or more processor cores.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 6:
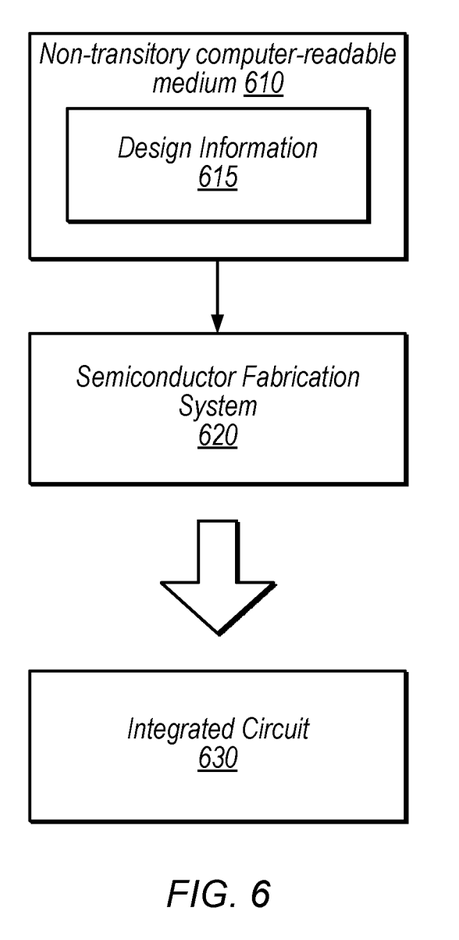
FIG. 6 is a block diagram illustrating an example computer-readable medium that stores circuit design information, according to some embodiments.

FIG. 6 is a block diagram illustrating an example non-transitory computer-readable storage medium that stores circuit design information, according to some embodiments. In the illustrated embodiment semiconductor fabrication system 620 is configured to process the design information 615 stored on non-transitory computer-readable medium 610 and fabricate integrated circuit 630 based on the design information 615.

Non-transitory computer-readable storage medium 610, may comprise any of various appropriate types of memory devices or storage devices. Non-transitory computer-readable storage medium 610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 610 may include other types of non-transitory memory as well or combinations thereof. Non-transitory computer-readable storage medium 610 may include two or more memory mediums which may reside in different locations, e.g., in different computer systems that are connected over a network.

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabricate at least a portion of integrated circuit 630. The format of design information 615 may be recognized by at least one semiconductor fabrication system 620. In some embodiments, design information 615 may also include one or more cell libraries which specify the synthesis and/or layout of integrated circuit 630. In some embodiments, the design information is specified in whole or in part in the form of a netlist that specifies cell library elements and their connectivity.

Design information 615, taken alone, may or may not include sufficient information for fabrication of a corresponding integrated circuit. For example, design information 615 may specify the circuit elements to be fabricated but not their physical layout. In this case, design information 615 may need to be combined with layout information to actually fabricate the specified circuitry.

Integrated circuit 630 may, in various embodiments, include one or more custom macrocells, such as memories, analog or mixed-signal circuits, and the like. In such cases, design information 615 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements shown in FIGS. 1-3 and 5. Further, integrated circuit 630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a register file configured to store operands for multiple client circuits;
arbitration circuitry configured to select from among multiple received requests to access the register file;
first interface circuitry configured to store access requests from a first client circuit in first buffer circuitry and provide requests from the first buffer circuitry to the arbitration circuitry via a first input to the arbitration circuitry; and
supplemental interface circuitry configured to receive unsuccessful requests from the first client circuit store received requests in second buffer circuitry, and provide requests from the second buffer circuitry to the arbitration circuitry via a second input to the arbitration circuitry;
wherein the arbitration circuitry is configured to select from among requests received from the first interface circuitry, the supplemental interface circuitry, and interface circuitry for one or more other client circuits.

2. The apparatus of claim 1, wherein the apparatus is configured to adjust a priority value for the requests in response to rejection by the arbitration circuitry.

3. The apparatus of claim 2, wherein the first client circuit is configured to increase priority of a request in response to rejection of the request by the arbitration circuitry and rejection of the request by the supplemental interface circuitry.

4. The apparatus of claim 1, wherein the supplemental interface circuitry is configured to receive unsuccessful requests from multiple client circuits, buffer received unsuccessful requests in the second buffer circuitry, and provide the buffered requests to the arbitration circuitry.

5. The apparatus of claim 4, wherein the supplemental interface circuitry is configured to select between rejected requests from multiple client circuits in a cycle based on amounts of data buffer space reserved in the second buffer circuitry for respective ones of the multiple client circuits.

6. The apparatus of claim 4, wherein the supplemental interface circuitry includes a data buffer configured to store accessed register file data and wherein the data buffer includes multiple ports that are dedicated to respective different client circuits that share the supplemental interface circuitry.

7. The apparatus of claim 1, wherein the first interface circuitry and the supplemental interface circuitry are configured to communicate with the arbitration circuitry using one or more valid-ready interfaces.

8. The apparatus of claim 1, wherein the arbitration circuitry is configured to select from among requests from different client circuits that are configured to request accesses with different numbers of bytes of register file data per clock cycle.

9. The apparatus of claim 1, wherein the first interface circuitry is located physically closer to the arbitration circuitry than to the first client circuit.

10. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:

a register file configured to store operands for multiple client circuits;
arbitration circuitry configured to select from among multiple received requests to access the register file;
first interface circuitry configured to store access requests from a first client circuit in first buffer circuitry and provide requests from the first buffer circuitry to the arbitration circuitry via a first input to the arbitration circuitry; and
supplemental interface circuitry configured to receive unsuccessful requests from the first client circuit, store received requests in second buffer circuitry, and provide requests from the second buffer circuitry to the arbitration circuitry via a second input to the arbitration circuitry;
wherein the arbitration circuitry is configured to select from among requests received from the first interface circuitry, the supplemental interface circuitry, and interface circuitry for one or more other client circuits.

11. The non-transitory computer readable storage medium of claim 10, wherein the circuit is configured to adjust a priority value for the requests in response to rejection by the arbitration circuitry.

12. The non-transitory computer readable storage medium of claim 10, wherein the first client circuit is configured to increase priority of a request in response to rejection of the request by the arbitration circuitry and rejection of the request by the supplemental interface circuitry.

13. The non-transitory computer readable storage medium of claim 12, wherein the arbitration circuitry is configured to select from among requests from different client circuits that are configured to request accesses with different numbers of bytes of register file data per clock cycle.

14. The non-transitory computer readable storage medium of claim 10, wherein the supplemental interface circuitry is configured to receive unsuccessful requests from multiple client circuits, buffer received unsuccessful requests, and provide the buffered unsuccessful requests to the arbitration circuitry.

15. The non-transitory computer readable storage medium of claim 14, wherein the supplemental interface circuitry is configured to select between rejected requests from multiple client circuits in a cycle based on amounts of data buffer space reserved for respective ones of the multiple client circuits.

16. The non-transitory computer readable storage medium of claim 14, wherein the supplemental interface circuitry includes a data buffer configured to store accessed register file data and wherein the data buffer includes multiple ports that are dedicated to respective different client circuits that share the supplemental interface circuitry.

17. The non-transitory computer readable storage medium of claim 10, wherein the first interface circuitry and the supplemental interface circuitry are configured to communicate with the arbitration circuitry using one or more valid-ready interfaces.

18. A method, comprising:
storing, by a register file, operands for multiple client circuits;
providing, by first interface circuitry to arbitration circuitry from first buffer circuitry via a first input to the arbitration circuitry, a first request to access the register file from a first client circuit;
storing the request in second buffer circuitry, by supplemental interface circuitry, in response to rejection of the first request by the arbitration circuitry;

providing, by the supplemental interface circuitry to the arbitration circuitry in a subsequent clock cycle, the first request via a second input to the arbitration circuitry; and selecting, by the arbitration circuitry, the first request provided by the supplemental interface circuitry, in parallel with a second request to access the register file from the first client circuit, wherein the second request is provided by the first interface circuitry via the first input.

19. The method of claim 18, further comprising:
adjusting a priority value for a request in response to rejection by the arbitration circuitry and the supplemental interface circuitry.

20. The method of claim 18, further comprising:
providing rejected requests from multiple different client circuits, by the supplemental interface circuitry, to the arbitration circuitry in different clock cycles.

* * * * *